US012643335B2

(12) United States Patent
Uragaki

(10) Patent No.: US 12,643,335 B2
(45) Date of Patent: Jun. 2, 2026

(54) PRINT APPARATUS, METHOD OF CONTROLLING PRINT APPARATUS, AND STORAGE MEDIUM

(71) Applicant: CANON KABUSHIKI KAISHA, Tokyo (JP)

(72) Inventor: Takeshi Uragaki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 18/586,258

(22) Filed: Feb. 23, 2024

(65) Prior Publication Data

US 2024/0294020 A1 Sep. 5, 2024

(30) Foreign Application Priority Data

Mar. 1, 2023 (JP) ................................ 2023-031383

(51) Int. Cl.

*B41J 29/46* (2006.01)
*B41J 11/00* (2006.01)
*B41J 29/387* (2006.01)

(52) U.S. Cl.

CPC .......... *B41J 11/006* (2013.01); *B41J 29/387* (2013.01); *B41J 29/46* (2013.01)

(58) Field of Classification Search

None

See application file for complete search history.

(56) References Cited

U.S. PATENT DOCUMENTS

2017/0227912 A1* 8/2017 Iino ........................ G03G 15/70

FOREIGN PATENT DOCUMENTS

EP 1995199 A2 * 11/2008 ............ B65H 43/00
JP H11258881 A 9/1999
JP 2017191288 A * 10/2017
WO WO-2024025593 A1 * 2/2024 ............ G03G 15/55

OTHER PUBLICATIONS

English translation of JP 2017-191288, publication date Oct. 19, 2017. (Year: 2017).*

* cited by examiner

*Primary Examiner* — Leslie J Evanisko
(74) *Attorney, Agent, or Firm* — Canon U.S.A., Inc. IP Division

(57) ABSTRACT

A method of controlling a print apparatus configured to convey a sheet to a static elimination apparatus configured to perform static elimination processing on the sheet includes performing control, in a case where a jam of the sheet occurs, to stop print processing, and displaying at least an occurrence position of the jam and information prompting a user to check a static elimination setting.

7 Claims, 12 Drawing Sheets

PRINT APPARATUS, METHOD OF CONTROLLING PRINT APPARATUS, AND STORAGE MEDIUM

BACKGROUND

Field of the Disclosure

The present disclosure relates to a print apparatus, a method of controlling the print apparatus, and a storage medium.

Description of the Related Art

A recording medium used for a print operation (hereinafter representatively referred to as a "sheet") is conveyed while the recording medium is statically charged due to residual charges generated during an electrophotographic process or due to slight friction with a conveyance roller or a guide, which is caused during conveyance of the sheet. Due to the static electricity, there is a case where sheets stick to each other or a sheet sticks to a roller, thereby causing a jam. Adherence of dust or paper dust to a printed product causes a decrease in quality of the printed product.

For example, plain paper or the like exhibits low electric resistance as electric resistance of a sheet itself, and charge transfer within the paper easily occurs. Thus, the plain paper has a small electric charge amount, and static charges are quickly eliminated. However, a sheet made of a synthetic resin (plastic), such as thick paper, synthetic paper, and coated paper, exhibits high electric resistance as electric resistance of the sheet itself, and charge transfer within the synthetic sheet hardly occurs. As a result, there is a tendency that the sheet, such as the synthetic paper and the coated paper, is more easily statically charged, and more residual charges remain on the sheet. It is generally known that the sheet is susceptible to the influence of an environment, especially the influence of a humidity, and is more statically charged due to the influence of a decreased amount of electric discharge into the air in a lower humidity environment.

If post-processing is performed in a state where sheets stick to each other, it affects processing of aligning sheets, which not only decreases the quality of the post-processing, but also triggers a jam due to a paper feeding defect or a sheet conveying defect at the time of the post-processing and may cause a damage on the sheet and an apparatus.

For this reason, to avoid such a risk, it is desirable that static electricity on the sheet after a print process before execution of the post-processing be eliminated. To address this issue, a proposal or the like is made for a technique of applying a voltage to a conveyance roller located on a downstream side in a sheet conveyance direction to eliminate static charges on the sheet (Japanese Patent Application Laid-Open No. H11-258881).

The static elimination implemented by a configuration in which a voltage is applied to the conveyance roller (hereinafter referred to as "static elimination roller") cancels out charged static electricity by applying opposite charges of static charges on the sheet to the sheet via the static elimination roller. Hence, static elimination control with the static elimination roller (application of opposite charges of static charges on the sheet to the static elimination roller) needs to be appropriately performed according to a charge amount on the sheet. That is, this means that there is an optimum charge adjustment value for static elimination for each print environment, such as a humidity, and for each brand of a sheet.

If the static elimination control is performed on the sheet in an inappropriate charge adjustment state, there is a possibility that opposite charges are generated, thereby further causing sticking of sheets, and causing a jam due to sticking of a sheet to a roller. In a case where the jam occurs, this has been conventionally addressed by notification about a position of the paper jam to a user and removal of a sheet, but no consideration has been given of a possibility that an inappropriate charge adjustment value causes charging and the jam when a static elimination apparatus is connected. In this case, even if the jam is eliminated by removal of the jammed sheet, because the true cause of the error is not eliminated, a similar jam occurs when a job is executed again.

SUMMARY

According to an aspect of the present disclosure, a print apparatus configured to convey a sheet to a static elimination apparatus configured to perform static elimination processing on the sheet includes a printer unit, at least one processor configured to, in a case where a jam of the sheet occurs, perform control to stop print processing being performed by the printer unit, and a display configured to display at least an occurrence position of the jam and information prompting a user to check a static elimination setting.

Further features of various embodiments of the present disclosure will become apparent from the following description of exemplary embodiments with reference to the attached drawings.

DESCRIPTION OF THE EMBODIMENTS

Example embodiments of the present disclosure will be described below with reference to the drawings.

The claims are not limited to the following exemplary embodiments, and all combinations of features described in the exemplary embodiments are not necessarily essential to a means for solving the issues of the present disclosure.

Figure 1:
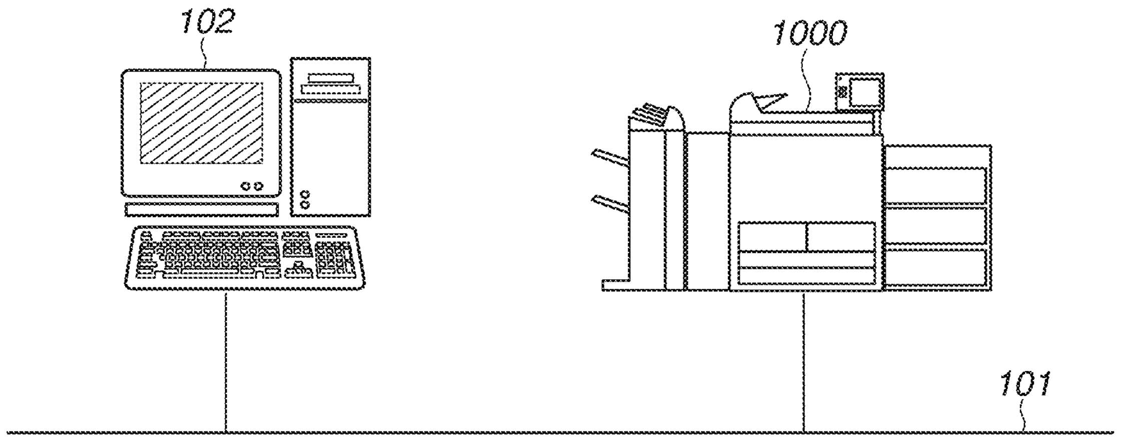
FIG. 1 is a hardware configuration diagram of a system according to a first exemplary embodiment.

A first exemplary embodiment will now be described. FIG. 1 illustrates the simplest configuration of the present exemplary embodiment. The configuration includes a print system 1000 and a client computer 102 (hereinafter referred to as a "PC"), which are connected to each other via a network 101. The PC 102 is capable of transmitting page description language (PDL) code data, which is a print job, to the print system 1000 via the network 101.

<Hardware Configuration of Print System>

(Hardware Block Diagram)

Figure 2:
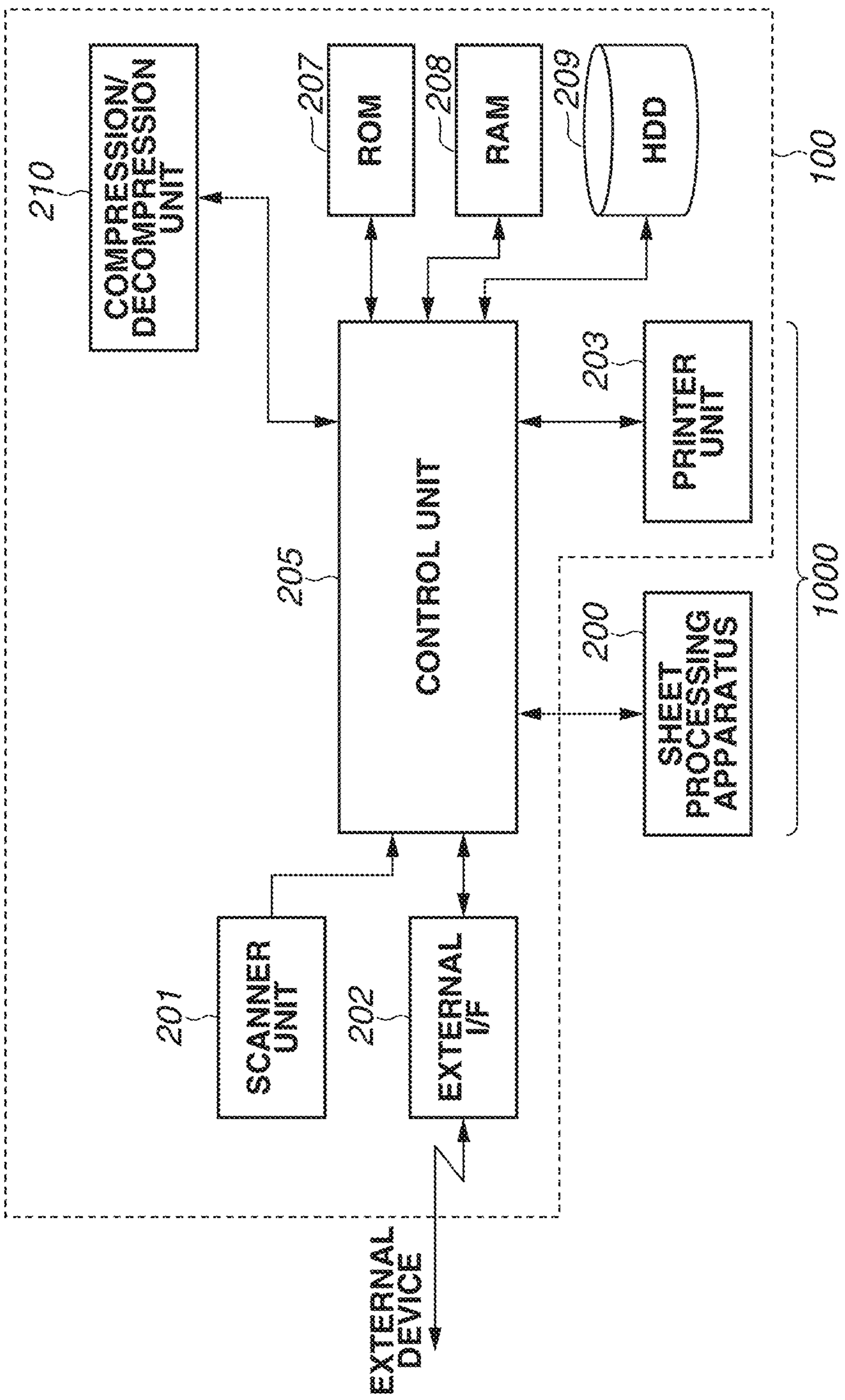
FIG. 2 is a software block diagram of a print apparatus.

FIG. 2 is a hardware block diagram of the print system 1000. The print system 1000 includes a print apparatus 100, which is a part surrounded by dotted line in FIG. 2, and a sheet processing apparatus 200. A freely selected number of sheet processing apparatuses 200 can be connected to the print apparatus 100. In the present exemplary embodiment, a description will be given by taking an example of a multi-function peripheral (MFP) having a plurality of functions, such as a copy function and a printer function, as the print apparatus 100. However, the print apparatus 100 may be a single function print apparatus having only the copy function or the printer function.

The print system 1000 has a configuration that enables the sheet processing apparatus 200 connected to the print apparatus 100 to execute sheet processing on a sheet printed by the print apparatus 100. Alternatively, the print system 1000 can be constituted by only the print apparatus 100 to which the sheet processing apparatus 200 is not connected.

The sheet processing apparatus 200 is configured to be capable of communicating with the print apparatus 100. When receiving an instruction from the print apparatus 100, the sheet processing apparatus 200 is capable of executing sheet processing as described below.

A scanner unit 201 reads an image on a document, converts the image into image data, and transfers the image data to another unit.

An external interface (I/F) 202 transmits/receives data to/from another apparatus connected to the network 101.

A printer unit 203 prints an image based on the input image data onto a sheet.

Figure 4:
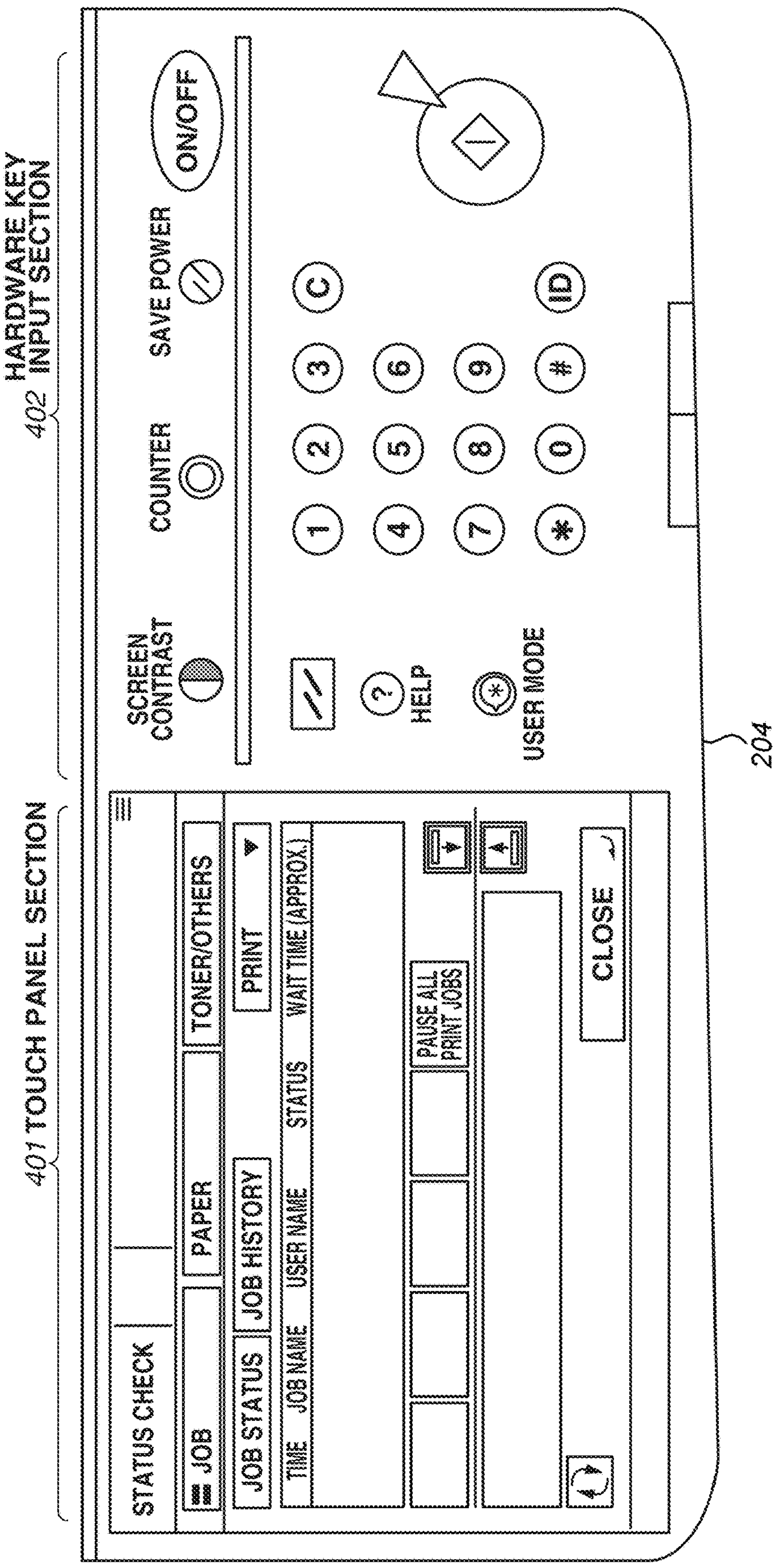
FIG. 4 is an overview of an operation unit included in the print apparatus.

An operation unit 204 has a configuration as illustrated in FIG. 4, and includes a hardware key input section (key input section) 402 and a touch panel section 401. The operation unit 204 accepts instructions from a user via these sections. The operation unit 204 performs various kinds of display on the touch panel section 401 included in the operation unit 204.

A control unit 205 performs integrated control of processing, operations, or the like of various kinds of units included in the print system 1000. That is, the control unit 205 controls an operation of the print apparatus 100 and an operation of the sheet processing apparatus 200 connected to the print apparatus 100.

A read-only memory (ROM) 207 stores various kinds of computer programs executed by the control unit 205.

For example, the ROM 207 stores therein a program for causing the control unit 205 to execute various kinds of processing in flowcharts and a display control program necessary for displaying various kinds of setting screens. The flowcharts and the various kinds of setting screens will be described below. The ROM 207 stores therein a program for causing the control unit 205 to execute an operation of interpreting the PDL code data received from the PC 102 and expanding the PDL data into raster image data. In addition, the ROM 207 stores therein a boot sequence, font information, and the like.

A random-access memory (RAM) 208 stores therein image data and PDL code data transmitted from the scanner unit 201 or the external I/F 202, various kinds of programs loaded from the ROM 207, and setting information. The RAM 208 stores therein information regarding the sheet processing apparatus 200 (information regarding a type and function of each sheet processing apparatus 200 connected to the print apparatus 100 and other information). The control unit 205 can use the information regarding these sheet processing apparatuses 200 stored in the RAM 208 for control.

A hard disk drive (HDD) 209 includes a hard disk, a drive unit that reads/writes data from/to the hard disk, and the like. The HDD 209 is a high-capacity storage device to store image data that is input from the scanner unit 201 and that is compressed by a compression/decompression unit 210.

The control unit 205 is capable of printing the image data stored in the HDD 209 using the printer unit 203 based on an instruction from the user. The HDD 209 is also used as a spooler, and the control unit 205 is capable of managing the PDL code data received from the PC 102 as a print job and storing the PDL code data in the HDD 209. The control unit 205 is capable of managing print jobs stored in the HDD 209, and is also capable of acquiring the number of stored print jobs and setting information set in the print jobs.

The compression/decompression unit 210 performs a compression/decompression operation on image data or the like stored in the RAM 208 or the HDD 209 by various kinds of compression schemes, such as a Joint Bi-level Image Experts Group (JBIG) scheme and a Joint Photographic Experts Group (JPEG) scheme.

(Details of Hardware)

Figure 3:
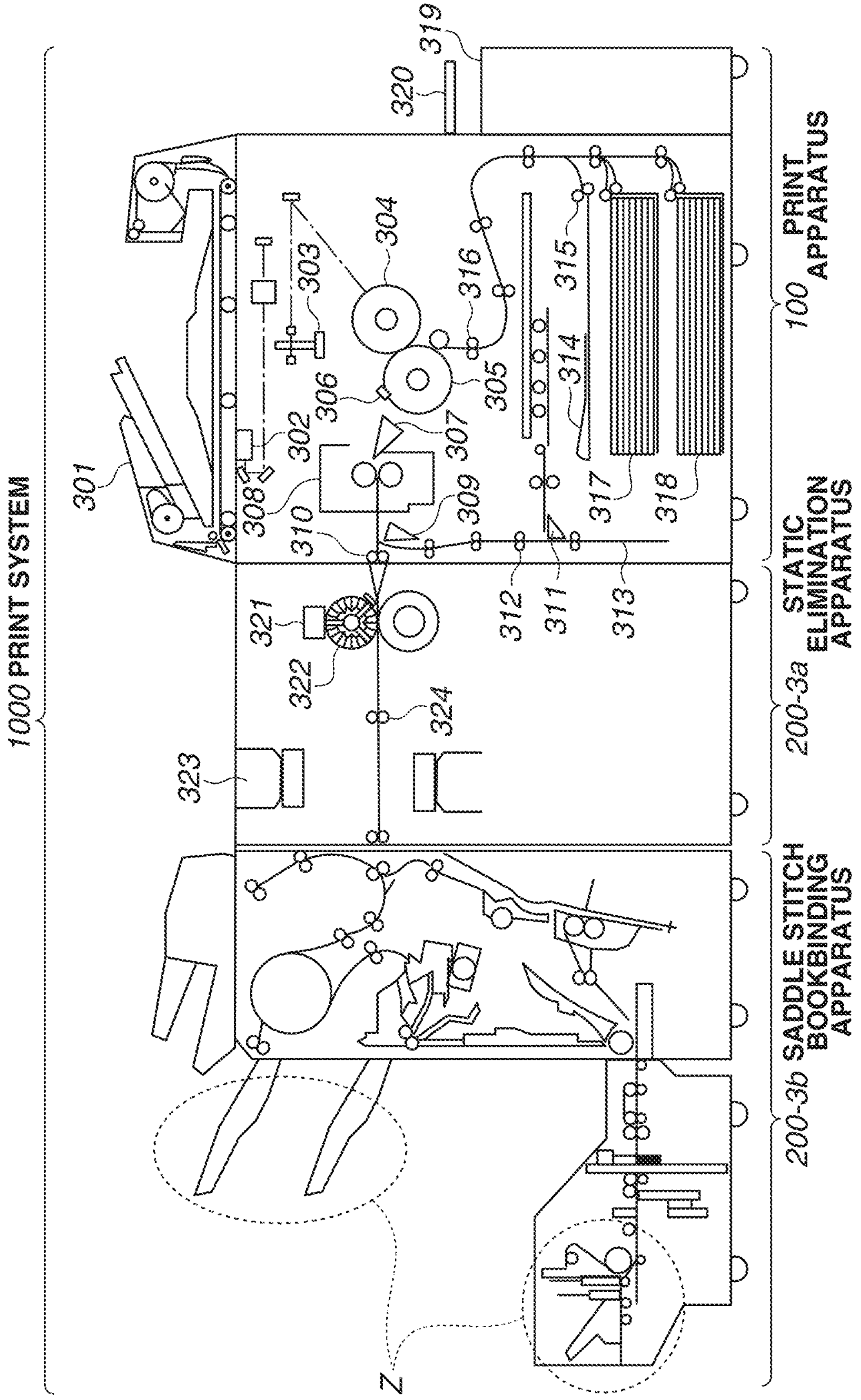
FIG. 3 is a cross-sectional view of a print system.

A hardware configuration of the print system 1000 is to be described with reference to FIG. 3. FIG. 3 is a cross-sectional view illustrating the print apparatus 100 and the sheet processing apparatus 200 connected to the print apparatus 100. The sheet processing apparatus 200 includes a static elimination apparatus 200-3*a* and a saddle stitch bookbinding apparatus 200-3*b*.

—Print Apparatus—

First, the print apparatus 100 is to be described. An automatic document feeder (ADF) 301 sequentially separates a document bundle set on a placement surface of a document tray from the first page of the document in the order of pages, and conveys each page of the document onto a platen glass for scanning by a scanner 302.

The scanner 302 reads an image of each page of the document conveyed onto the platen glass, and converts the image into image data with a charge-coupled device (CCD).

A rotary polygon mirror (polygon mirror or the like) 303 causes a light beam, such as laser light, which is modulated according to the image data, to be incident thereon, and irradiates a photosensitive drum 304 with the light beam as reflection scan light via a reflection mirror.

A latent image formed with laser light on the photosensitive drum 304 is developed with toner, and a toner image is transferred to a sheet that is attached onto a transfer drum 305. This series of image forming process is sequentially executed with respect to toner of yellow (Y), magenta (M), cyan (C), and black (K), whereby a full color image is formed. After the image forming process is executed four times, the sheet on the transfer drum 305 on which the full color image is formed is separated by a separation pawl 306, and conveyed to a fixing device 308 by a pre-fixing conveyance device 307.

The fixing device 308 includes a combination of rollers and a belt, and a heat source such as a halogen heater is built in the fixing device 308. The fixing device 308 dissolves toner on the sheet onto which the toner image is transferred with heat and pressure, and fixes the toner image.

A discharge flapper 309 is configured to be pivotable about a pivot axis, and defines a sheet conveyance direction. When the discharge flapper 309 pivots in a clockwise direction in FIG. 3, the sheet is conveyed straight and discharged to the outside of the print apparatus 100 by paper discharge rollers 310. The control unit 205 controls the print apparatus 100 in the above-mentioned sequence so as to execute one-sided printing.

On the other hand, in a case where images are formed on respective sides of the sheet, the discharge flapper 309 pivots in a counterclockwise direction in FIG. 3, and a traveling direction of the sheet is changed to a downward direction, and sent to a double-sided conveyance unit. The double-sided conveyance unit includes an inversion flapper 311, inversion rollers 312, an inversion guide 313, and a both-surface tray 314.

The inversion flapper 311 pivots about a pivot axis, and defines the sheet conveyance direction. In a case of processing a double-sided print job, the control unit 205 controls the printer unit 203 to cause the inversion flapper 311 to pivot in the counterclockwise direction in FIG. 3 and send the sheet whose first surface has been subjected to printing in the printer unit 203 to the inversion guide 313 via the inversion rollers 312. The control unit 205 then temporarily stops the inversion rollers 312 in a state where a trailing end of the sheet is nipped by the inversion rollers 312, and subsequently causes the inversion flapper 311 to pivot in the clockwise direction in FIG. 3. Simultaneously, the control unit 205 rotates the inversion rollers 312 in the opposite direction. With this operation, the control unit 205 performs control to switch back and convey the sheet, and guide the sheet to the both-surface tray 314 in a state where the trailing end of the sheet and the leading end of the sheet are switched with each other. The sheet is temporarily stacked in the both-surface tray 314, and is thereafter sent again to registration rollers 315 by re-feed rollers 316. At this time, the sheet is sent so that a surface opposite to the first surface in a transfer process faces the photosensitive drum 304. A second surface image is formed on the second surface of the sheet in a process similarly to the above-mentioned process. The respective images are then formed on both surfaces of the sheet, and the sheet is subjected to a fixing process and discharged from the inside of the main body of the print apparatus 100 to the outside of the print apparatus 100 via paper discharge rollers 310. The control unit 205 controls the print apparatus 100 in the above-mentioned sequence so as to execute both-sided printing.

The print apparatus 100 includes a paper feed unit that stores sheets required for print processing. Examples of the paper feed unit include paper feed cassettes 317 and 318 (each capable of storing, for example, 500 sheets), a paper feed deck 319 (capable of storing, for example, 500 sheets), and a manual feed tray 320. Various kinds of sheets having different sizes and materials can be separately set in the paper feed cassettes 317 and 318 and the paper feed deck 319. Various kinds of sheets including a special sheet, such as an overhead projector (OHP) sheet, can be set in the manual feed tray 320.

<Static Elimination Apparatus>

Figure 5:
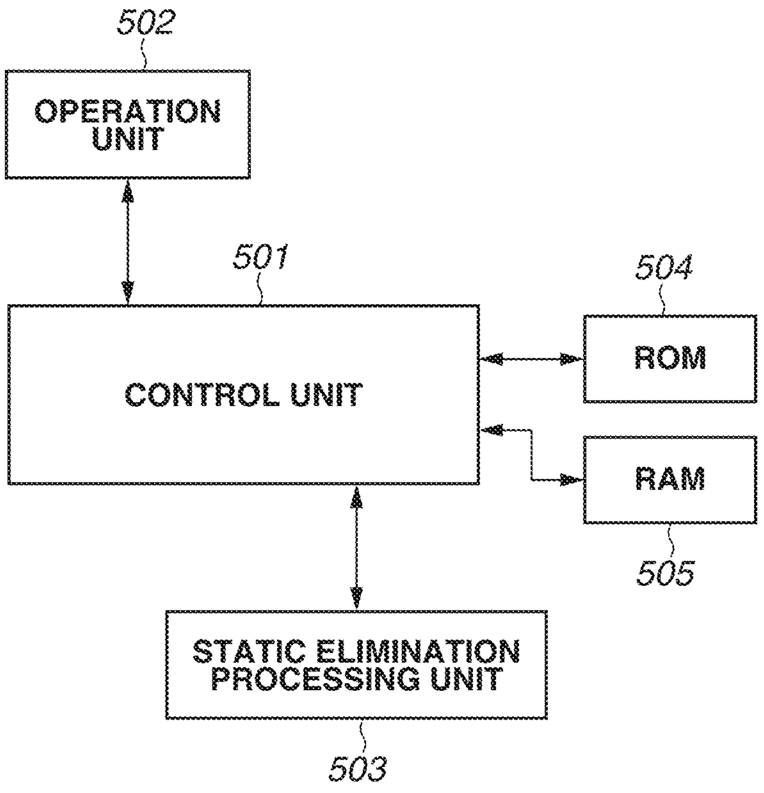
FIG. 5 is a software block diagram of a static elimination apparatus.

The static elimination apparatus 200-3*a* will now be described. FIG. 5 is a system block diagram of the static elimination apparatus 200-3*a*. The static elimination apparatus 200-3*a* also includes a control unit 501 separate from the control unit 205 of the print apparatus 100. The control unit 501 integrally manages the whole of the static elimination apparatus 200-3*a* while communicating with the control unit 205 of the print apparatus 100 illustrated in FIG. 2 via a bus, which is not illustrated.

(Operation Unit)

Figure 6:
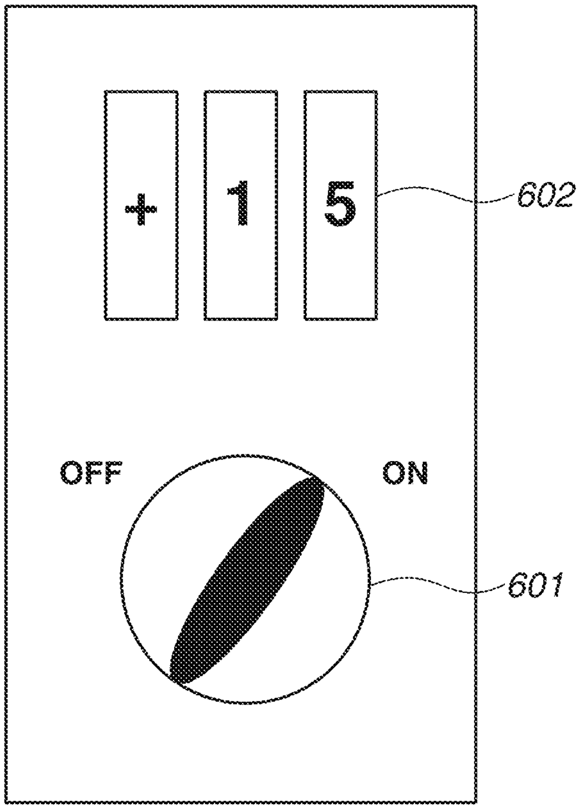
FIG. 6 is a view illustrating an operation unit included in the static elimination apparatus.

An operation unit 502 has a configuration as illustrated in FIG. 6, and the user can make settings to the static elimination apparatus 200-3*a* via the operation unit 502.

A mode setting switch 601 illustrated in FIG. 6 is used for switching whether the static elimination apparatus 200-3*a* performs static elimination (ON/OFF). The control unit 501 controls a static elimination processing unit 503, which will be described below, to execute static elimination processing only when the mode setting switch 601 is ON.

An adjustment dial 602 composed of a thumb rotary switch is for adjusting the strength of the static elimination control when the mode setting switch 601 is ON, and is controlled by the control unit 501 so as to be enabled only when the mode setting switch 601 is ON.

The static elimination processing unit 503 includes a static elimination roller 322, which will be described below, an ionizer 323, and a voltage application controller 321 that applies a voltage to each of the static elimination roller 322 and the ionizer 323, and is a part that plays the role of performing static elimination processing on a conveyed sheet. The control unit 501 implements control of applying a voltage to each of the static elimination roller 322 and the ionizer 323 via the voltage application controller 321.

A boot program for the static elimination apparatus 200-3*a*, a control program for the operation unit 502, a static elimination processing program for the static elimination processing unit 503, and the like are stored in a ROM 504. The control unit 501 then loads a necessary program from the ROM 504 into a RAM 505 as appropriate and executes the program.

The static elimination processing executed in the static elimination processing unit 503 is now to be described with reference to FIG. 7.

(Static Elimination Processing)

Figure 7:
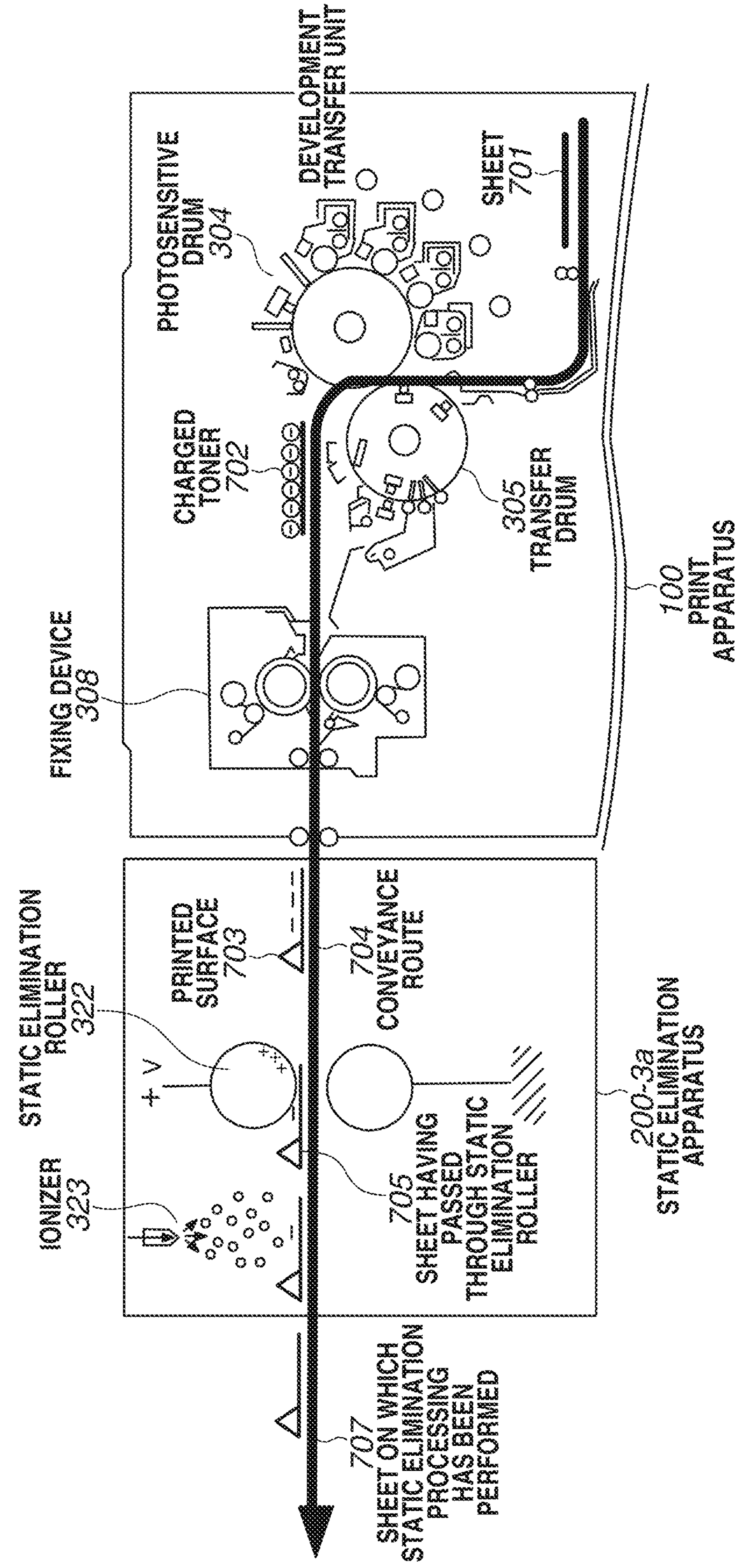
FIG. 7 is a schematic view for describing static elimination processing.

FIG. 7 is a view schematically illustrating how the static elimination apparatus 200-3*a* executes the static elimination processing on a sheet that has been subjected to print processing by the print apparatus 100. First, a sheet 701 is conveyed to a development transfer unit including the photosensitive drum 304 and the transfer drum 305 via a conveyance route 704, and toner is placed on the sheet 701. Charged toner 702 placed on the sheet 701 is negatively charged, and the sheet 701 subjected to fixing by the fixing device 308 is conveyed to the static elimination apparatus 200-3*a* while the sheet 701 is negatively charged on a printed surface 703 side. The static elimination apparatus 200-3*a* includes the positively charged static elimination roller 322, and applies positive charges to the negatively charged printed surface 703 by performing contact static elimination with the static elimination roller 322 to eliminate the charges. However, it is assumed that negative charges, that cannot be completely eliminated by the static elimination processing with the static elimination roller 322 or oppositely charged positive charges, remain on a sheet 705 after the sheet 705 passes the static elimination roller 322. The static elimination apparatus 200-3*a* described in the present exemplary embodiment has a configuration including the ionizer 323 on the downstream side of the static elimination roller 322. The ionizer 323 is a device that applies a voltage to an electrode needle included in the device to cause corona discharge and eliminate static charges using ions generated by the corona discharge. In this manner, static charges are roughly eliminated by the static elimination roller 322, and residual charges are adjusted by the ionizer 323, whereby a sheet 707 that is discharged from the static elimination apparatus 200-3*a* after being subjected to the static elimination processing is in a state in which static charges are eliminated.

Going back to the description with reference to the cross-sectional view in FIG. 3, the static elimination apparatus 200-3*a* includes the static elimination roller 322 and its paired roller, and the sheet conveyed to the static elimination apparatus 200-3*a* is conveyed while being nipped by the static elimination roller 322 and the paired roller, and while being subjected to the above-mentioned rough static elimination by the static elimination roller 322. Thereafter, the sheet is subjected to the static elimination processing of eliminating residual charges by the ionizer 323 while being conveyed by conveyance rollers 324 to the outside of the static elimination apparatus 200-3*a*.

(Saddle Stitch Bookbinding Apparatus)

The saddle stitch bookbinding apparatus 200-3*b* is now to be described. Examples of sheet processing to be performed by the saddle stitch bookbinding apparatus 200-3*b* include saddle stitch bookbinding, punching processing, cutting processing, shifted sheet discharge processing, folding processing, and staple processing. These jobs are each referred to as a "saddle stitch bookbinding job".

In a case of processing the saddle stitch bookbinding job, the control unit 205 first causes the saddle stitch bookbinding apparatus 200-3*b* to convey a sheet, as a target of the job, subjected to printing by the print apparatus 100, and thereafter causes the saddle stitch bookbinding apparatus 200-3*b* to execute the sheet processing on the sheet as the target of the job. The control unit 205 then causes a paper discharge destination Z of the saddle stitch bookbinding 200-3*b* to hold a printed product of the saddle stitch bookbinding job, which is subjected to the sheet processing performed by the saddle stitch bookbinding apparatus 200-3*b*. There is a plurality of candidates for the paper discharge destination Z. This configuration enables the saddle stitch bookbinding apparatus 200-3*b* to execute a plurality of types of sheet processing, and the candidates are used when sheets are separately discharged to different destinations depending on sheet processing. In the present exemplary embodiment, a description about a detailed procedure for conveying the saddle stitch bookbinding job is omitted.

<Error Display Processing>

Figure 8:
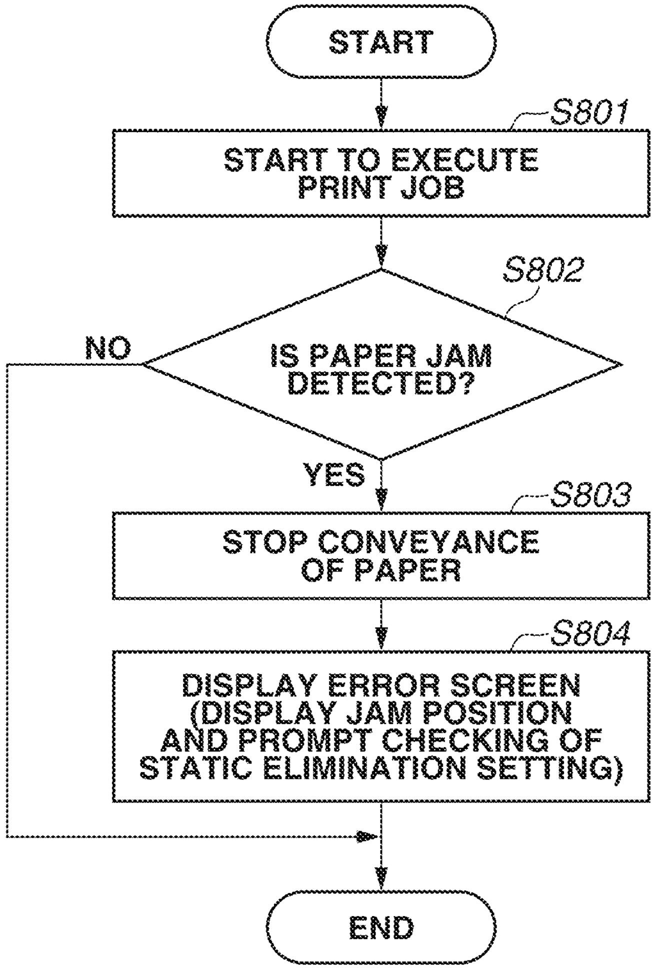
FIG. 8 is a flowchart describing jam error display processing according to the first exemplary embodiment.

Error display processing at the time of print processing executed by the print system 1000 is now to be described with reference to a flowchart in FIG. 8. This processing is implemented by the control unit 205, which is a CPU, loading a program stored in the ROM 207 into the RAM 208 and executing the program.

In step S801, when a print job is input, the control unit 205 of the print apparatus 100 interprets the received print job and starts to execute printing.

In step S802, the control unit 205 detects the occurrence of a paper jam and an occurrence position of the paper jam in the sheet processing apparatus 200 during execution of printing based on a received error code. In a case where the control unit 205 determines that the paper jam occurs (YES in step S802), the processing proceeds to step S803. In a case where the control unit 205 determines that no paper jam occurs (NO in step S802), because the processing on the paper jam has been completed until the end without a problem, the processing ends.

In step S803, in a case where the paper jam occurs, the control unit 205 stops conveyance of the sheet.

In step S804, the control unit 205 of the print apparatus 100 displays an error notification screen for making notifications about the jam on the operation unit 204 of the print apparatus 100.

Figure 10:
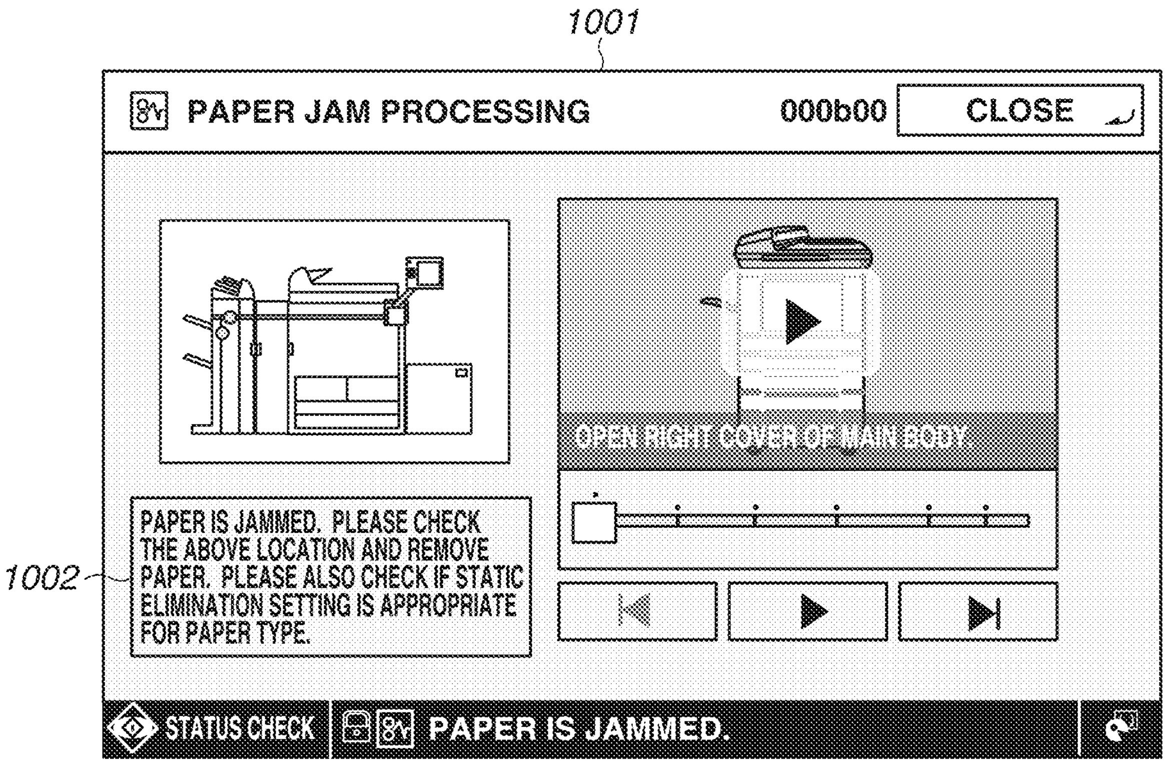
FIG. 10 illustrates a jam error notification screen.

FIG. 10 illustrates an error notification screen 1001 of the print system 1000. In step S804, the control unit 205 displays the detected occurrence position of the paper jam on a side view of the print system 1000. Because there is a possibility that the paper jam occurs due to the static elimination processing, a message prompting a user to re-check a setting value is displayed in a field 1002.

Thereafter, the processing ends.

As a result, it becomes possible to point out a possibility that the setting for the static elimination processing is not appropriately made when the paper jam occurs in the print system 1000, and to prompt the user to perform an appropriate operation.

A second exemplary embodiment is now to be described. The first exemplary embodiment is directed to the technique of displaying the error message in consideration of the influence of the static elimination apparatus 200-3*a* when the paper jam occurs. However, because the static elimination processing is not performed in a case where a setting value for the static elimination processing to be performed by the static elimination apparatus 200-3*a* is OFF, there is no influence on the paper jam. In consideration of this case, in the second exemplary embodiment, a description will be given of a case where error message display is switched depending on whether the static elimination apparatus 200-3*a* is operating, that is, whether the setting value for the static elimination processing is ON or OFF.

<Error Display Processing>

Figure 9:
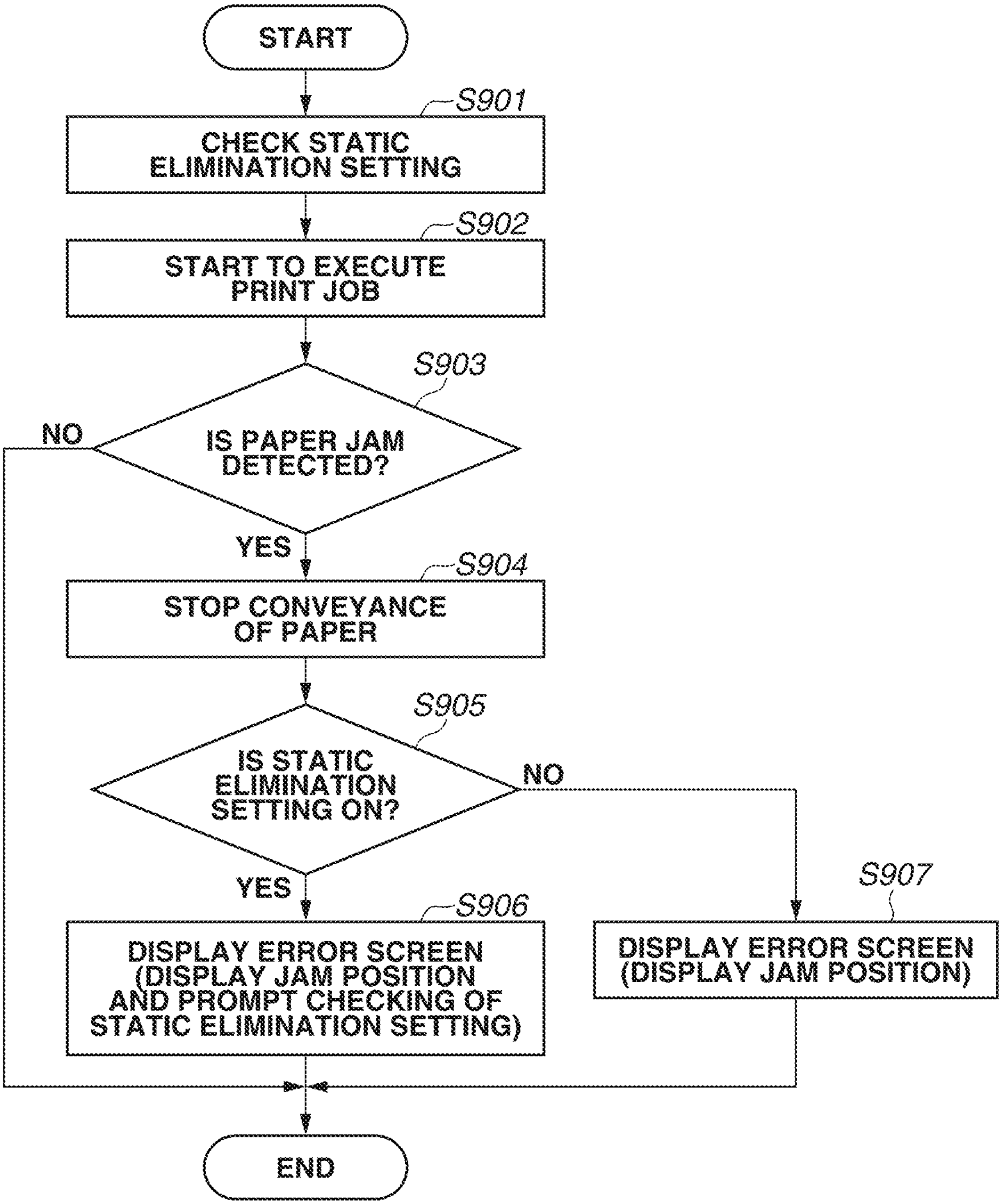
FIG. 9 is a flowchart describing jam error display processing according to a second exemplary embodiment.

FIG. 9 is a flowchart of error display processing at the time of print processing executed by the print system 1000. This processing is implemented by the control unit 205 loading a program stored in the ROM 207 into the RAM 208 and executing the program.

In step S901, the control unit 205 of the print system 1000 checks whether a static elimination setting of the static elimination apparatus 200-3*a* is ON or OFF at the time of startup. Specifically, the control unit 501 of the static elimination apparatus 200-3*a* that has received an inquiry from the control unit 205 of the print apparatus 100 acquires a status of a mode setting switch 601 in the operation unit 502 of the static elimination apparatus 200-3*a* and makes a reply to the control unit 205 of the print apparatus 100.

In step S902, the control unit 205 starts to execute the print processing by being triggered by reception of a print job.

In step S903, the control unit 205 determines whether it has detected the occurrence of a paper jam by a notification of an error code. In a case where the control unit 205 has detected the occurrence of the paper jam (YES in step S903), the processing proceeds to step S904. In a case where no paper jam occurs (NO in step S903), because the processing on the paper jam has been completed until the end without a problem, the processing ends.

In step S904, the control unit 205 performs control to stop conveyance of the sheet.

In step S905, the control unit 205 determines whether a result of the checking of the static elimination setting (step S901) is ON (whether the static elimination apparatus 200-

3*a* is operating). In a case where the result of the checking of the static elimination setting is ON (in a case where the static elimination apparatus 200-3*a* is operating) (YES in step S905), the processing proceeds to step S906. In a case where the result of the checking of the static elimination setting is OFF (in a case where the static elimination apparatus 200-3*a* is not operating) (NO in step S905), the processing proceeds to step S907.

In step S906, the control unit 205 displays, on the operation unit 204, an error message prompting the user to check the static elimination setting in addition to the position of the jam (as illustrated in FIG. 10), and the processing ends.

In step S907, the control unit 205 displays only the position of the jam on the operation unit 204, and the processing ends.

According to the present exemplary embodiment, it is possible to display an error in consideration of the static elimination setting, and prompt the user to perform a more appropriate operation.

A third exemplary embodiment is now to be described. Although the consideration is given to ON/OFF of the static elimination setting in the second exemplary embodiment, even if the static elimination setting is ON, if the paper jam occurs in a process before the process in the static elimination apparatus 200-3*a*, there is no influence on the static elimination processing. In this regard, in the third exemplary embodiment, a description will be given of a case where an error display is performed depending on a positional relationship between a connection position of the static elimination apparatus 200-3*a* and the occurrence position of the paper jam.

<Error Display Processing>

Figure 11:
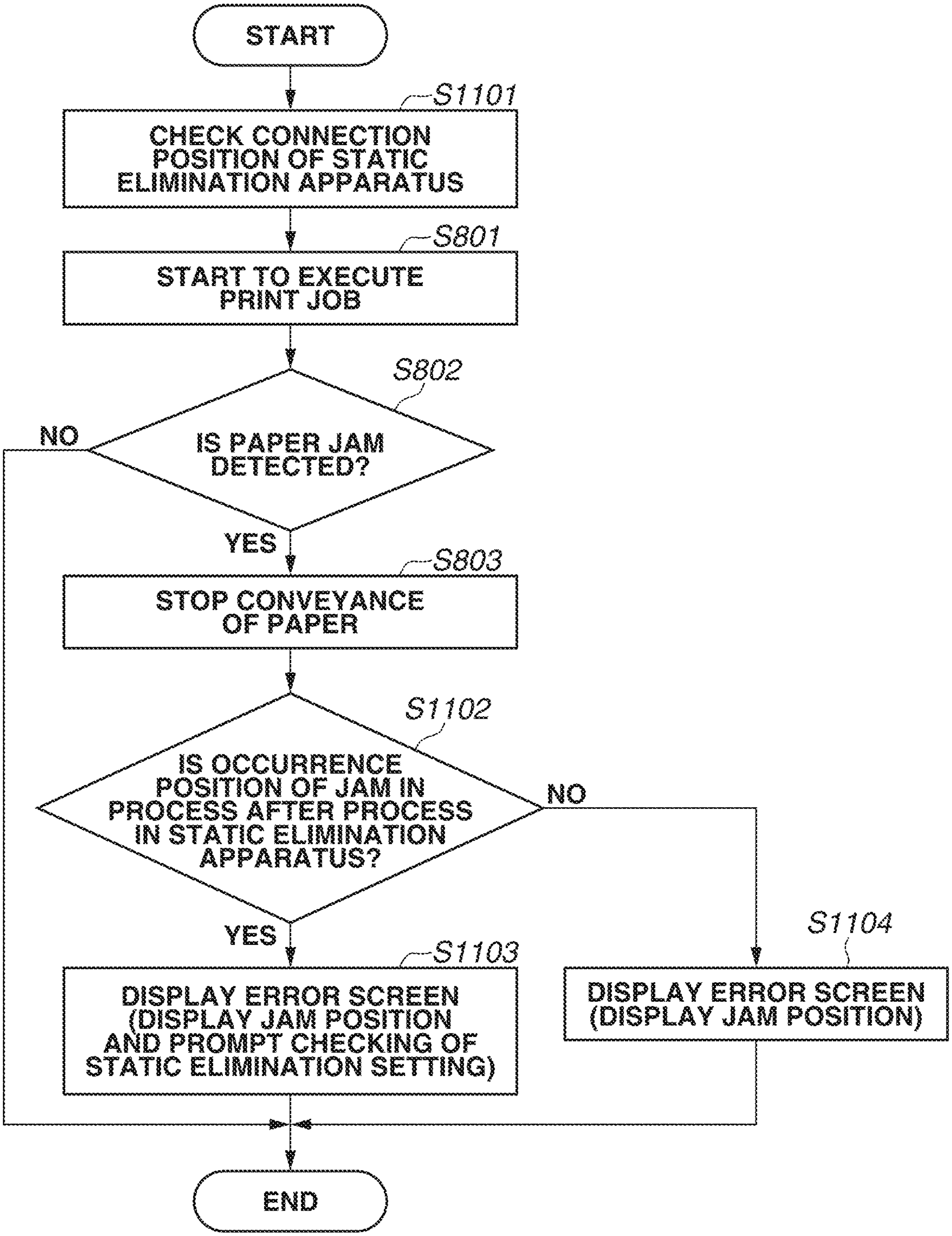
FIG. 11 is a flowchart describing processing of displaying a jam error display screen according to a third exemplary embodiment.

Processing of displaying an error depending on the connection position of the static elimination apparatus 200-3*a* in the third exemplary embodiment is to be described with reference to FIG. 11. The flowchart in FIG. 11 is implemented by the control unit 205 loading a program stored in the ROM 207 into the RAM 208 and executing the program.

In step S1101, the control unit 205 of the print system 1000 checks the connection position of the static elimination apparatus 200-3*a* at the time of startup. Processing in steps S801 to S803 after the start of the print job is identical to the processing in the first exemplary embodiment, and thus a description thereof is omitted. The present exemplary embodiment utilizes that the occurrence position of the paper jam has been detected based on the error code in step S802.

In step S1102, after the paper jam occurs, the control unit 205 compares the connection position of the static elimination apparatus 200-3*a* and the occurrence position of the paper jam. In a case where the occurrence position of the paper jam is in a process after the process in the static elimination apparatus 200-3*a* (YES in step S1102), the processing proceeds to step S1103. In a case where the occurrence position of the paper jam is in a process before the process in the static elimination apparatus 200-3*a* (NO in step S1102), the processing proceeds to step S1104.

In step S1103, the control unit 205 displays, on the operation unit 204, an error message prompting the user to check the static elimination setting in addition to the occurrence position of the paper jam, and the processing ends.

In step S1104, the control unit 205 displays only the position of the jam on the operation unit 204, and the processing ends.

According to the present exemplary embodiment, it is possible to determine whether a cause of the paper jam is related to the static elimination processing based on the positional relationship between the occurrence position of the paper jam and the connection position of the static elimination apparatus 200-3*a* to display an error, and to prompt the user to perform a more appropriate operation.

Figure 12:
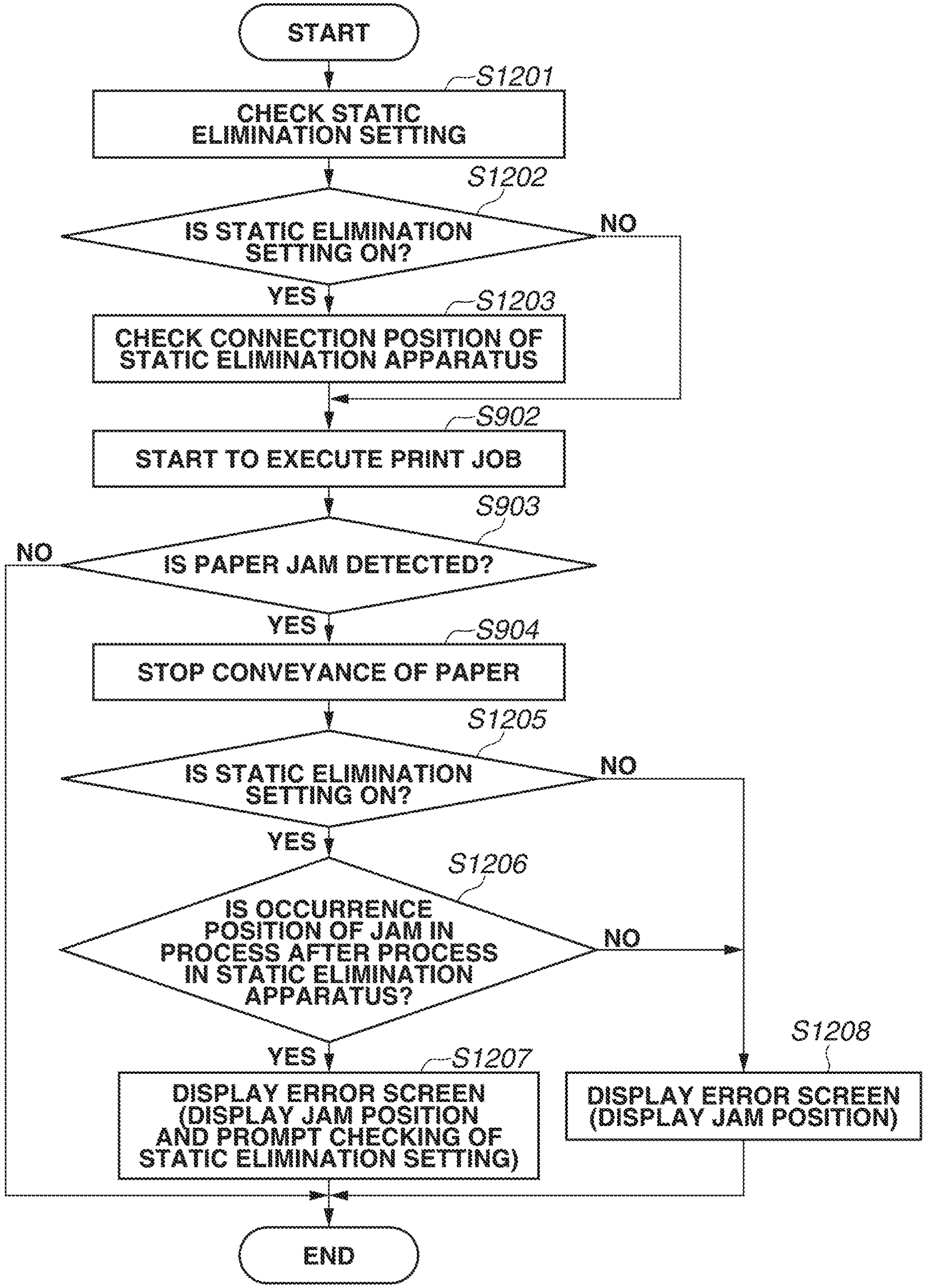
FIG. 12 is a flowchart illustrating processing of displaying a jam error display screen according to a fourth exemplary embodiment.

A fourth exemplary embodiment is now to be described. A description will be given of error display in consideration of both ON/OFF of the setting of the static elimination processing to be performed by the static elimination apparatus 200-3*a* and the connection position of the static elimination apparatus 200-3*a* with reference to FIG. 12. The flowchart in FIG. 12 is implemented by the control unit 205 loading a program stored in the ROM 207 into the RAM 208 and executing the program.

<Error Display Processing>

In step S1201, the control unit 205 of the print system 1000 checks whether the static elimination apparatus 200-3*a* is operating (whether the static elimination setting is ON or OFF) at the time of startup.

In step S1202, the control unit 205 determines whether the checked static elimination setting is ON or OFF. In a case where the static elimination setting is ON (YES in step S1203), the processing proceeds to step S1203. In a case where the static elimination setting is OFF (NO in step S1203), the processing proceeds to step S902.

In step S1203, the control unit 205 checks the connection position of the static elimination apparatus 200-3*a*. Processing in steps S902 to S904 after the start of the print job is identical to the processing in the second exemplary embodiment (FIG. 9), and thus a description thereof is omitted.

In step S1205, the control unit 205 determines whether a result of the checking of the static elimination setting (step S1201) is ON (whether the static elimination apparatus 200-3*a* is operating). In a case where the result of the checking of the static elimination setting is ON (in a case where the static elimination apparatus 200-3*a* is operating) (YES in step S1201), the processing proceeds to step S1206. In a case where the result of the checking of the static elimination setting is OFF (in a case where the static elimination apparatus 200-3*a* is not operating) (NO in step S1201), the processing proceeds to step S1208.

In step S1206, in a case where the static elimination setting is ON based on the above-mentioned result of checking of the static elimination setting, the control unit 205 checks the positional relationship between the connection position of the static elimination apparatus 200-3*a* and the occurrence position of the jam. In a case where the control unit 205 determines that the occurrence position of the paper jam is in a process after the process in the static elimination apparatus 200-3*a* (YES in step S1206), the processing proceeds to step S1207. In a case where the control unit 205 determines that the occurrence position of the paper jam is in a process before the process in the static elimination apparatus 200-3*a* (NO in step S1206), the processing proceeds to step S1208.

In step S1207, the control unit 205 displays, on the operation unit 204, an error message prompting the user to check the static elimination setting in addition to the position of the jam, and the processing ends.

In step S1208, the control unit 205 displays only the position of the jam on the operation unit 204, and the processing ends.

With this configuration, it is possible to perform appropriate error display depending on the positional relationship between the connection position of the static elimination apparatus 200-3*a* and the occurrence position of the paper jam and ON/OFF of the static elimination setting.

In the above description, the error message is displayed on the display unit. However, as a method of notifying the user, another notification means, such as an audio guide, may be adopted.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-031383, which was filed on Mar. 1, 2023 and which is hereby incorporated by reference herein in its entirety.

What is claimed is:

1. A printing system comprising:

a printer that prints an image on a sheet;

a static elimination apparatus that performs a static elimination process on the sheet on which the image is printed by the printer;

a display;

at least one memory that stores instructions; and at least one processor that causes, by executing the instructions, the printing system to:

detect a jam of the sheet;

on a basis of the detection of the jam of the sheet, perform control to stop print processing being performed by the printer;

display at least an occurrence of the jam; and display, on the display, a message that prompts a user to check a setting of the static elimination apparatus in a case where an occurrence position of the jam is downstream of a position where the static elimination process is performed.

2. The printing system according to claim 1, wherein the at least one processor further causes, by executing the instructions, the printing system not to display the message that prompts the user to check the setting of the static elimination apparatus in a case where the occurrence position of the jam detected by the at least one processor is on an upstream side of the static elimination apparatus.

3. The printing system according to claim 1, wherein the at least one memory and the at least one processor are further configured to determine whether static elimination to be performed by the static elimination apparatus is set as enabled, and wherein, in a case where the at least one processor determines that the static elimination to be performed by the static elimination apparatus is set as enabled, the at least one processor further causes, by executing the instructions, the printing system to display the message that prompts the user to check the setting of the static elimination apparatus.

4. The printing system according to claim 3, wherein, in a case where the at least one processor determines that the static elimination to be performed by the static elimination apparatus is not set as enabled, the at least one processor further causes, by executing the instructions, the printing system not to display the message that prompts the user to check the setting of the static elimination apparatus.

5. The printing system according to claim 1, wherein the at least one processor further causes, by executing the instructions, the printing system to display the occurrence position of the jam so as to be superimposed on a figure of the printing system.

6. A control method for a printing system including a printer that prints an image on a sheet, a display, and a static elimination apparatus that performs a static elimination process on the sheet on which the image is printed by the printer, the control method comprising:

detecting a jam of the sheet;

on a basis of the detection of the jam of the sheet, performing control to stop print processing;

displaying at least an occurrence of the jam; and displaying, on the display, a message that prompts a user to check a setting of the static elimination apparatus in a case where an occurrence position of the jam is downstream of a position where the static elimination process is performed.

7. A non-transitory computer-readable storage medium storing computer-executable instructions for causing a computer to execute a control method for a printing system including a printer that prints an image on a sheet, a display, and a static elimination apparatus that performs a static elimination process on the sheet on which the image is printed by the printer, the control method comprising:

detecting a jam of the sheet;

on a basis of the detection of the jam of the sheet, performing control to stop print processing;

displaying at least an occurrence of the jam; and displaying, on the display, a message that prompts a user to check a setting of the static elimination apparatus in a case where an occurrence position of the jam is downstream of a position where the static elimination process is performed.

* * * * *